United States Patent [19]

Grote, Sr. et al.

[11] 3,743,343

[45] July 3, 1973

[54] VEHICLE SPRAY CONTROL MEANS

[75] Inventors: Walter F. Grote, Sr., Madison, Ind.; Edward J. Kimmel, Sr., Louisville, Ky.

[73] Assignee: The Grote Manufacturing Company Inc.

[22] Filed: Sept. 21, 1971

[21] Appl. No.: 182,369

[52] U.S. Cl............................ 296/1 S, 280/154.5 R
[51] Int. Cl............................................. B62d 35/00
[58] Field of Search........................... 280/154.5 R; 296/1 S, 91; 180/84

[56] References Cited
UNITED STATES PATENTS
3,198,545  8/1965  McDaniel................ 280/154.5 R
3,341,222  9/1967  Roberts.................... 280/154.5 R
3,653,709  4/1972  Gravett......................... 296/1 S FOREIGN PATENTS OR APPLICATIONS
1,903,789  8/1970  Germany......................... 180/84

Primary Examiner—Leo Friaglia
Assistant Examiner—Robert R. Song
Attorney—Harry B. O'Donnell, III

[57] ABSTRACT

This invention provides means for controlling the discharge of spray and mist generated by the rotation of the wheels of a wheeled vehicle during its forward movement over a wet surface. Basically, the means provided by the present invention comprise baffle means located on the bottom of the vehicle and being arranged to channel air flow generated by its forward movement toward its rear in a direction generally perpendicular to the rotational axes of its wheels such that turbulent discharge of spray and mist from beneath the vehicle in a direction generally transverse to that of its movement is greatly mitigated.

21 Claims, 10 Drawing Figures

PATENTED JUL 3 1973 3,743,343
SHEET 1 OF 2
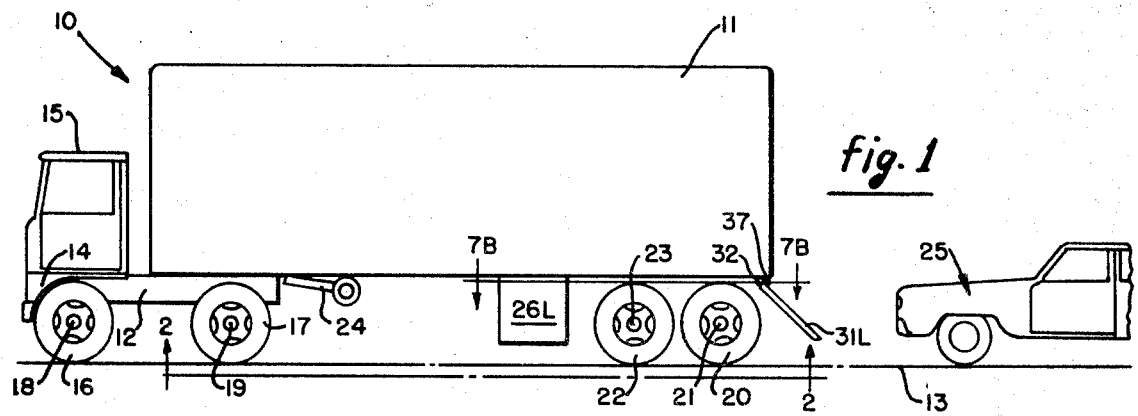
fig. 1
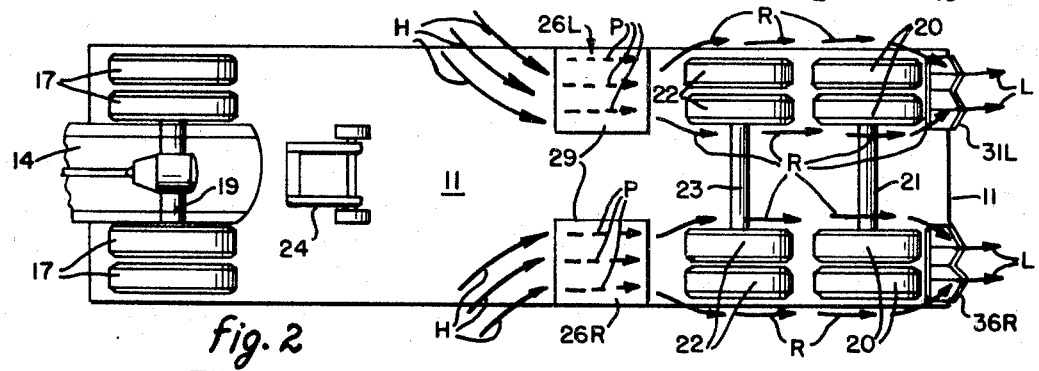
fig. 2
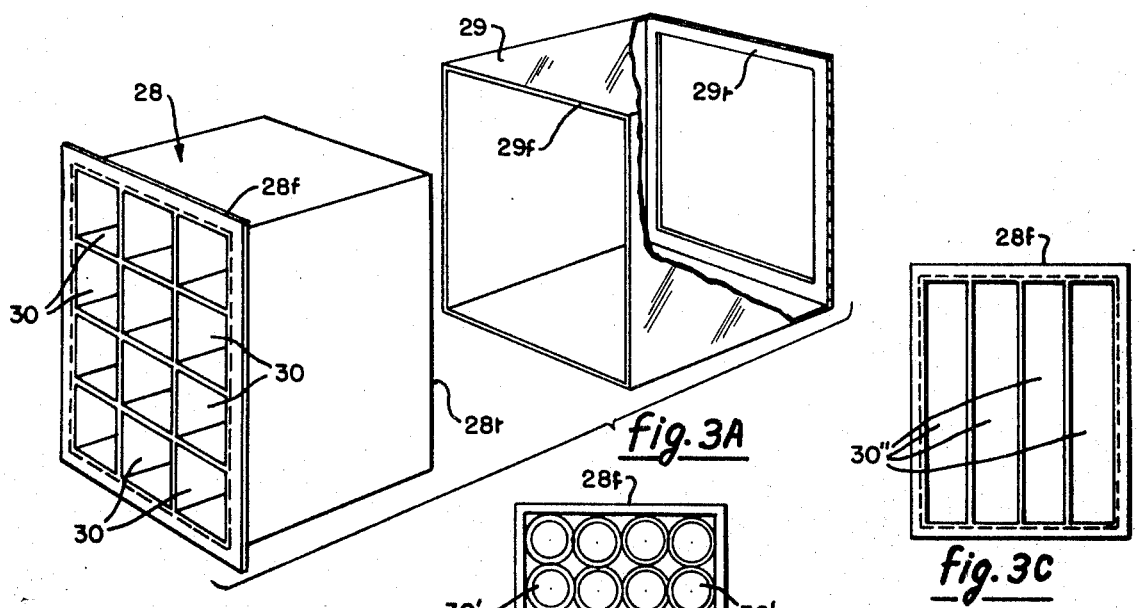
fig. 3A
fig. 3B
fig. 3C
INVENTORS
WALTER F. GROTE, SR. &
EDWARD J. KIMMEL, SR.
BY
THEIR ATTORNEY

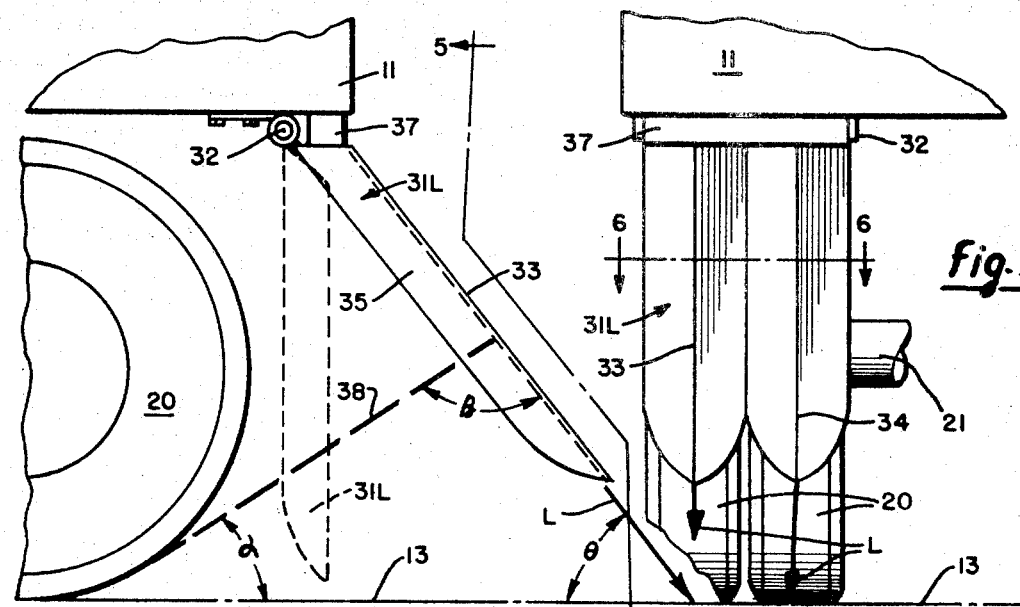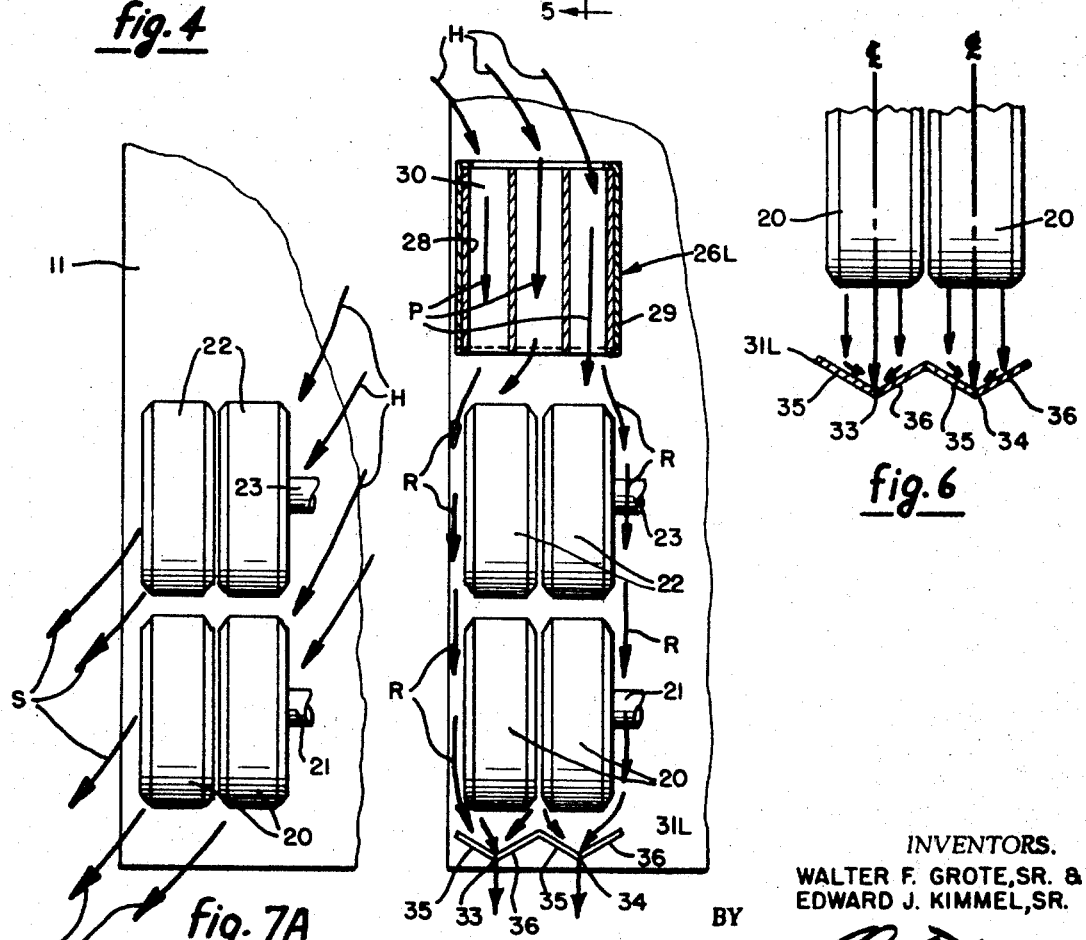
INVENTORS.
WALTER F. GROTE, SR. &
EDWARD J. KIMMEL, SR.
THEIR ATTORNEY

VEHICLE SPRAY CONTROL MEANS

BACKGROUND OF THE INVENTION

This invention relates to wheeled vehicles, such as motor trucks and the like, and more particularly, to means for controlling the discharge of spray and mist generated by the rotation of its wheels during forward movement of such a wheeled vehicle over a wet surface.

Heretofore, the fine spray and mist that has been generated by the rotation of its wheels during rapid forward movement of a wheeled vehicle over a wet surface has created a hazardous road condition for operators of other vehicles. This hazardous condition has been particularly attributable to the great amounts of such spray and mist which have been turbulently discharged from beneath the vehicle in a direction generally transverse to the direction of its movement. In the past, this turbulent transverse or sidewise discharge of spray and mist from beneath such vehicles, particularly large motor trucks, has in many cases so obscured visibility as to make it extremely hazardous for anyone to drive past such a vehicle under wet road conditions.

SUMMARY OF THE INVENTION

The present invention provides means for controlling the discharge of spray and mist generated by the rotation of the wheels of a wheeled vehicle during its forward movement over a wet surface. Basically, the means provided by the present invention comprise baffle means located on the bottom of the vehicle and being arranged to channel air flow generated by the forward movement of the vehicle toward its rear in a direction generally perpendicular to the rotational axes of its wheels. By employing the novel means provided by the present invention, it has been found that the turbulent discharge of the spray and mist from beneath the vehicle in a direction generally transverse or sidewise to that of the forward movement of the vehicle can be greatly limited or reduced.

Preferably, the vehicle is also provided with coagulating means pivotally mounted on its rear for gathering the spray and mist and deflecting the same downwardly onto the wet surface so that the visibility of a motorist following the vehicle will not be impaired.

BRIEF DESCRIPTION OF THE DRAWINGS

The present invention is illustrated in the accompanying drawings, wherein:

FIG. 1 is a somewhat schematic, left side elevational view of a large motor truck incorporating a presently preferred form of the present invention;

FIG. 2 is an enlarged fragmentary sectional view taken along the line 2—2 of FIG. 1;

FIG. 3A is a greatly enlarged, partly-broken, exploded, fragmentary front elevational perspective view showing details of a presently preferred form of the baffle means employed by the present invention and illustrating a disposable baffle element telescopically removed from the front end of a receiving member for it that is mounted on the bottom of the vehicle;

FIGS. 3B and 3C are front elevational views of two alternative forms of the removable baffle element illustrated in FIG. 3A;

FIG. 4 is a greatly enlarged, fragmentary elevational view of the left rear corner of the truck of FIG. 1, showing in detail the construction and mounting of a presently preferred form of the spray and mist coagulating means employed by the present invention;

FIG. 5 is a fragmentary sectional view taken along line 5—5 of FIG. 4;

FIG. 6 is a fragmentary sectional view taken along line 6—6 of FIG. 5;

FIG. 7A is a greatly enlarged fragmentary view looking downwardly on the left rear wheels of a truck similar to that shown in FIG. 1 which is not provided with the present invention and illustrates the prior-art problem; and FIG. 7B is a greatly enlarged fragmentary sectional view taken along line 7B—7B of FIG. 1 and illustrates the improvement over the prior-art condition shown in FIG. 7A that is provided by the present invention.

DESCRIPTION OF THE PREFERRED EMBODIMENTS

Referring now to the drawings and, more particularly to FIGS. 1 and 2 thereof, there is illustrated a wheeled vehicle, a large motor truck 10, incorporating a presently preferred form of the present invention.

The truck 10 includes a trailer portion 11 that is removably connected to a tractor portion 12 and is propelled over a surface 13, such as a highway, road, and the like, thereby. The tractor portion 12 includes a chassis 14 which supports a cab 15 and is itself supported on the surface 13 by front and rear wheels 16 and 17 which are respectively journaled for rotation about front and rear axles 18 and 19 that are respectively connected to the chassis 14 adjacent its front and rear ends.

As illustrated in FIGS. 1 and 2, the trailer portion 11 has its front end removably connected to the rear end of the tractor portion 12 and is supported above the surface 13 thereby, while the rear end of the trailer portion 11 is supported on the surface 13 by eight rear wheels, four of which rear wheels 20 are journaled for rotation about a first axle 21, and the other four of which rear wheels 22 are journaled for rotation about a second axle 23. the like As best shown in FIG. 2, both of the trailer axles 21 and 23 are mounted adjacent the rear end of the trailer portion 11 and both extend generally perpendicular to the direction in which the trailer portion 11 is propelled across the surface 13 by the tractor portion 12. However, the second axle 23 is mounted slightly forward of the front axle 21. The bottom of the front end of the trailer portion 11 is also provided with a retractable "landing gear" 24 for supporting it when disconnected from the tractor portion 12.

Heretofore, during rainy or showery weather, a considerable amount of fine spray and mist has been generated by rotation of the wheels of a vehicle, such as the truck 10, during its rapid forward movement over the water-coated surface 13. This has created a hazardous road condition for operators in other vehicles, such as the following auto 25 shown in FIG. 1. This hazardous condition has been particularly attributable to the great amounts of such spray and mist which previously have been turbulently discharged in a direction generally transverse or sidewise to that of its forward movement. In the past, this turbulent transverse or sidewise discharge of spray and mist from beneath vehicles, such as the large motor truck 10, has in many cases so obscured visibility as to make it extremely hazardous for anyone such as the operator of the following auto 25 or theike to drive past such a vehicle 10 under wet road conditions.

The present invention is particularly concerned with providing means for controlling the aforenoted discharge of spray and mist. Basically, as illustrated in FIGS. 1, 2, 3A–C and 7B, the control means provided by the present invention comprises a pair of baffle means 26L and 26R which are respectively located on the opposite left and right sides of the bottom of the vehicle trailer portion 11 and are arranged to channel air flow generated by forward movement of the vehicle 10 toward the vehicle rear wheels 20 and 22 in a direction generally perpendicular to their rotational axes 21 and 23, such that the turbulent discharge of spray and mist from beneath the vehicle 10 adjacent these vehicle rear wheels 20 and 22 in a direction generally transverse or sidewise to that of the forward movement of the vehicle 10 (indicated by arrows S in FIG. 7A) can be eliminated or greatly mitigated (FIG. 7B).

More specifically, the baffle means 26L and 26R are of substantially similar construction to one another and each includes a disposable baffle element 28 that is removably mounted in a receiving member or frame 29. As illustrated in FIGS. 1, 2 and 3A, the two baffle element receiving members 29 comprise a pair of hollow box-like frames, one of which has one of its walls mounted on the bottom of the truck trailer portion 11 between the left rear wheels 17 of the tractor portion 12 and the forward wheels 22 at the left rear end of the trailer portion 11 and the other of which has one of its walls mounted on the bottom of the trailer portion 11 between the right rear wheels 17 of the tractor portion 12 and the forward wheels 22 at the right rear end of the trailer portion 11.

Preferably, each of the disposable baffle elements 28 (FIG. 3A) is formed of a plastic material, such as polyethylene, polypropylene, or of paper, and has a generally rectangular cross-section that is generally similar to that of its trailer portion-mounted receiving member 29 and is adapted to be slidably received therein through an opening 29f provided in the front wall thereof. As further shown in FIG. 3A, each receiving member or frame 29 also has an open rear wall, which faces the forward rear wheels 22 of the trailer portion 11 and this open rear wall is provided with an inwardly extending border 29r that is adapted to engage the rear peripheral edge 28r of the disposable baffle element 28 and prevent its rearward ejection therefrom. And, the front peripheral edge of each disposable baffle element 28 is provided with an outwardly extending rim 28f that engages the peripheral edge of the front opening 29f of the receiving member 29.

As illustrated in FIG. 3A, the baffle element 28 is subdivided by vertically and horizontally arranged partition members into a plurality of rectangular-shaped ducts 30. As shown in FIGS. 2 and 7B, these baffle element ducts 30 are intended to intercept the generally hyperbolic rearward air flow (indicated by arrows H) that is generated along the lower sides of the trailer portion 11 between the tractor portion rear wheels 17 and the wheels 20 and 22 at the rear end of the trailer portion 11 by forward movement of the truck 10 across the surface 13, and to thereby straighten or redirect this hyperbolic air flow H so as to channel it in a direction (indicated by arrows P) generally perpendicular to the rotational axes 21 and 23 of the vehicle rear wheels 20 and 22.

FIGS. 3B and 3C respectively illustrate alternative cross-sectional configurations which can be substituted for the air flow-channeling ducts 30 of the disposable baffle element 28 described in detail in FIG. 3A, with FIG. 3B showing the air flow-channeling ducts being formed by a plurality of hollow tubular members 30' while FIG. 3C shows air flow-channeling ducts 30'' formed by vertical partitions alone.

By employing the aforedescribed novel baffle means 26L and 26R provided by the present invention, it has been found, as particularly shown in FIGS. 2 and 7B, that the channeling of the air flow provided thereby will cause the spray and mist to hug or conform to the sides of the wheels 20 and 22 at the rear end of the vehicle 10 (as indicated by arrows R) and to be discharged rearwardly therefrom, such that the prior-art problem (FIG. 7A) of turbulent discharging of spray and mist from beneath the vehicle 10 adjacent its rear wheels 20 and 22 in a direction generally transverse or sidewise to that of its movement across the wet surface 13 can be greatly reduced or mitigated (FIG. 7B).

As further shown in FIGS. 1, 2, 4–6 and 7B, the vehicle 10 is preferably also provided with coagulating means pivotally mounted on its rear for gathering together or coagulating the spray and mist discharging rearwardly from the wheels 20 at its rear end into liquid streams and deflecting the same downwardly onto the wet surface 13 so that the visibility of a motorist following the vehicle 10 will not be impaired thereby.

More specifically, these coagulating means preferably comprise a pair of rigid coagulator members 31L and 31R which are respectively pivotally mounted by hinges 32 to the left and right rear ends of the vehicle trailer portion 11. The coagulator members 31L and 31R are of substantially similar construction to one another and each comprises a rigid element having a generally W-shaped cross-section (FIG. 6). Each of the deflector members 31L and 31R is constructed to have one of its ends pivotally connected to the trailer portion 11 by one of the hinges 32, while its opposite distal or free end hangs downwardly toward the surface 13. The two apices 33 and 34 of the W-shaped cross-section are made to be respectively aligned with the circumferential center lines of two of the rearmost wheels 20 and each coagulator member 31L and 31R has surfaces 35 and 36 on either side of its two apices 33 and 34 that are wide enough to cover the width of each of the two wheels 20 on one side of the trailer portion 11 and which converge rearwardly towards the apices 33 and 34.

With this arrangement, the spray or mist thrown rearwardly from the rearmost wheels 20 of the trailer portion 11 will be captured by the deflector member surfaces 35 and 36 and deflected inwardly towards their apices 33 and 34, where it will be gathered together or coagulated into liquid streams (indicated by arrows L) which will, in turn, be directed downwardly onto the wet surface 13.

As shown in FIGS. 1 and 4, each of the coagulator members 31L and 31R will be pivoted upwardly and rearwardly about its hinge 32 in reaction to the air flow generated by rapid forward movement of the vehicle 10 across the surface 13. In order to limit this upward and rearward movement, stop means 37 are provided on the left and right rear ends of the trailer portion bottom for engaging the upper ends of the coagulator members 31L and 31R. Preferably, this upward and rearward movement of the coagulator members 31L and 31R is limited by the stop means 37 such that the angle $\theta$ defined between each of the coagulator member apices 33 and 34 and the wet surface 13 is never less than about 30°.

Under typical highway operating circumstances, with the truck 10 moving forward across the surface 13 at a speed of 65–70 miles per hour, each of the coagulator members 31L and 31R will be pivoted upwardly and rearwardly into engagement with its stop means 37 and spray will be directed upwardly and rearwardly from the left and right side rearmost wheels 20 toward their respective coagulator members 31ll and 31R generally along a throwoff line 38 whose center defines another angle $\alpha$ of about 45° between it and the surface 13. This, in turn, will cause still another angle $\beta$ of about 105° to be defined between the spray throwoff center line 38 and the apices 33 and 34 of each of the coagulator members 31L and 31R, and will provide maximum operating efficiency of the coagulating means provided by the present invention.

Of course, when the vehicle 10 is stopped, both of the coagulator members 31L and 31R will be pivoted about their hinges 32 by gravity until their apices 33 and 34 are substantially vertical as shown in shadow in FIG. 4.

It should be apparent that while there have been described what are presently considered to be presently preferred embodiments of the present invention in accordance with the Patent Statutes, changes may be made in the disclosed apparatus without departing from the true spirit and scope of this invention. For example, the coagulator members 31L and 31R obviously would be made with a V-shaped rather than W-shaped cross-section, if the trailer axles 21 and 23 were provided with only one wheel per side rather than two wheels per side as illustrated. Furthermore, the baffle elements 28 need not necessarily be made either removable or disposable. It is, therefore, intended that the appended claims shall cover such modifications and applications that may not depart from the true spirit and scope of the present invention

What is claimed is:

1. Means for controlling the discharge of spray and mist generated by rotation of its wheels during forward movement of a wheeled vehicle over a wet surface comprising: ducted baffle means located on the bottom of said vehicle and being arranged to channel air flow generated by said forward movement of said vehicle toward its rear in a direction generally perpendicular to the rotational axes of its wheels such that turbulent discharge of said spray and mist from beneath said vehicle in a direction generally transverse to that of said movement is greatly mitigated.

2. The invention of claim 1, wherein said baffle means comprise disposable baffle elements.

3. The invention of claim 2, wherein said baffle elements are formed of paper.

4. The invention of claim 2, wherein said baffle elements are formed of a plastic material.

5. The invention of claim 1, wherein said baffle means include a baffle element having a generally rectangular cross-section.

6. The invention of claim 5, wherein said cross-section is divided by partition means into a plurality of air flow-directing ducts.

7. The invention of claim 6, wherein said partition means include vertically arranged partition members.

8. The invention of claim 7, wherein said partition means also include horizontally arranged partition members.

9. The invention of claim 6, wherein said partition means include a plurality of hollow tubular members.

10. The invention of claim 1, further including coagulating means pivotally mounted on the rear of said vehicle for gathering said spray and mist together into a liquid stream and deflecting said stream downwardly onto said surface.

11. The invention of claim 10, wherein said coagulating means comprises a rigid coagulator member.

12. The invention of claim 11, wherein:

a. said coagulator member has a generally W-shaped cross-section including a pair of apices;

b. said coagulator member has one of its ends pivotally mounted to said rear of said vehicle and has another end opposite said pivotally mounted end which hangs downwardly toward said wet surface; and c. said apices are respectively aligned with the circumferential centerlines of two of said rear wheels.

13. The invention of claim 12, wherein said coagulator member has surfaces on opposite sides of each of said apices that are wide enough to cover the width of each of said two rear wheels and which converge rearwardly toward said apices.

14. The invention of claim 13, wherein said baffle means comprise disposable baffle elements.

15. The invention of claim 14, wherein said baffle elements are formed of paper.

16. The invention of claim 14, wherein said baffle elements are formed of a plastic material.

17. The invention of claim 14 wherein each of said baffle elements has a generally rectangular cross-section.

18. The invention of claim 17, wherein said rectangular cross-section is divided by partition means into a plurality of air flow-directing ducts.

19. The invention of claim 1, wherein said baffle means comprise baffle members located on opposite sides of the bottom of said vehicle.

20. The invention of claim 19, wherein said baffle members are arranged to channel said air flow toward the rear wheels of said vehicle.

21. The invention of claim 1, wherein said baffle means are arranged to channel said air flow toward the rear wheels of said vehicle.

* * * * *